United States Patent Office 3,130,057
Patented Apr. 21, 1964

3,130,057
PROCESSES FOR AGING AND FLAVORING COOLED MEAT IN A CONFINED ZONE WITH THAMNIDIUM AND AN ANTIBOTIC
Beverly E. Williams, La Grange Park, Ill., assignor to Hodges Research and Development Company, New York, N.Y., a corporation of California
No Drawing. Filed Feb. 7, 1963, Ser. No. 256,830
3 Claims. (Cl. 99—174)

This invention relates to processes for aging and for improving the flavor of cooled meat of edible animal carcasses in a confined zone using Thamnidium and an antibiotic and more particularly to such processes which may be practiced during shipment of the meat from the packer to the distributor or retailer.

More particularly this invention relates to processes for aging and improving the flavor of meat in a confined zone using Thamnidium and an antibiotic which are sprayed into the confined zone at the same time and as soon as the meat has been brought to conventional "cooler" temperature of approximately 35° F. The aging and flavoring of the meat may then take place during shipment of the meat from the packer to the distributor or retailer.

Even more particularly, the present invention relates to such processes which may be carried out in a confined zone provided by a container or bag more or less impervious to air, encasing the meat in which container or bag the meat is shipped under refrigerated conditions approximating 35° to 40° F. to the distributor or retailer.

In my United States Patent No. 2,926,089, temperature cycling processes are described in which Thamnidium is introduced during a cycle of warming of the meat and thereafter, during a cooling cycle for the meat, ultraviolet light or chemical sprays are employed to kill bacteria in the confined zone in which the meat is being treated. Most unexpectedly, I have now found that meat cooled to an internal temperature of under 50° F. can be simultaneously subjected to the action of Thamnidium and to a broad spectrum antibiotic such as Terramycin (oxytetracycline) to provide an entirely unexpected and synergistic effect in which an enhanced growth of the mold is obtained because the antibiotic prevents the growth of bacteria while at the same time the relatively low temperature of approximately 35° F. retards spoilage of the meat.

This synergistic result then makes it possible to bag the side of beef, a quarter of beef or other cuts of beef as well as pork, lamb and veal in plastic bags or the like, more or less impervious to air, when the meat has reached a temperature of approximately 35° to 40° F. in a conventional cooler. Thamnidium and the antibiotic are then sprayed into the bag in appropriate amounts, the bag is then sealed and the meat shipped in conventional reefer cars or trucks at approximately 35° F. to the distributor or retailer, such shipment usually taking from 2 to 5 days. At the end of this time the meat is improved in both tenderness and flavor. It is possible to hold the meat under such conditions for up to 10 days for superb tenderness and well aged flavor preferred by many. Tenderizing and improving the flavor of the meat during shipment is a great advantage to the packer who need not then provide locker space for large quantities of meat undergoing treatment.

It is therefore an object of the present invention to provide novel processes for the aging and flavoring of meat cooled to under 50° F. by placing the meat in a confined zone at approximately 35° to 40° F. and spraying Thamnidium and a broad spectrum antibiotic into the confined zone, the meat remaining in the confined zone from approximately two to ten days.

Another object is to provide such processes in which the treating period of from two to ten days may include shipping of the meat under "cooler" conditions and holding of the meat at the distributor or retailer.

Other and further objects of this invention will appear from the following illustrative embodiments thereof.

The liquid spray suspension of Thamnidium utilized in the present processes should contain at least 100,000 spores per cubic centimeter of solution to provide at least one spore for each one half square inch of meat surface. For a 350 pound side of beef approximately 3,000,000 spores of Thamnidium should be provided in the air within the bag.

Confining the meat in a small volume, as in the bags described above, which bags may be made of polyethylene, increases the relative humidity of the air in the bag to approximately 100% which unusually high humidity contributes to the tenderness of the meat. The greater the humidity in the bag the greater the activity of the hydrolytic natural meat enzyme, cathepsin, and the better the tenderization of the meat.

When a broad spectrum antibiotic spray solution of Terramycin is used it should have a ratio of about 0.5 gm. of Terramycin an ounce of water. One ounce of such solution, atomized into the bag, provides about 50 p.p.m. of antibiotic in the air and inoculates the meat with a minimum of 2 p.p.m. and a maximum of 10 p.p.m. of antibiotic to the meat. This amount of antibiotic is sufficient to "over-kill" the bacteria on the surface of the meat and promote a speedy and luxurious growth of the Thamnidium.

The term Thamnidium as used herein is intended to cover the family Thamnidiaceae. The genera recognized in this family are Thamnidium, Chaetostylum, Mucor, Chaetocladium, Helicostylum and Cokeromyces. The genera Mucor, Chaetostylum and Chaetocladium are so related and interrelated with Thamnidium as to render it difficult to distinguish therefrom and are all referred to as Thamnidium. The principal species are *Thamnidium elegans, Thamnidium chaetocladioides* and *Chaetostylum fresenii*. The only difference between genera of this family is the sporangiola, whether they are borne upon straight rather than curved ultimate branches of the sporangiophores or have certain other physical characteristics.

As noted above, the amount of antibiotic employed in the present processes should provide a maximum of 10 p.p.m. and a minimum of 2 p.p.m. to the treated meat. To provide the antibiotic in this range about 0.5 gm. of the antibiotic, usually Terramycin, is dissolved in about 1 ounce of water and this solution is sufficient for spraying into a bag containing a quarter of beef or equivalent wholesale cuts thereof. If an entire 300 pound side of beef is bagged then two ounces of water containing 1 gram of pure Terramycin should be sprayed into the bag.

When whole, round-dressed veal and lamb are to be processed in accordance with the present invention they are individually bagged and one ounce of the antibiotic solution described above is employed for lambs, two ounces of the antibiotic solution is employed for veal. Lambs weigh approximately 50 pounds and calves approximately 100 to 150 pounds.

After the meat is bagged and the Thamnidium solution and antibiotic solution sprayed into the bag the bag can either be shipped, as described above, or maintained in a conventional cooler, both at 35° F. for from three to up to ten days to permit the Thamnidium and high humidity to age, tenderize and flavor the meat while the relatively low temperature and the antibiotic prevent excessive deterioration of the meat or of its appearance.

While bagging the meat, as discussed above, is relatively inexpensive and is easy and practical in the cooler, the meat can be confined in any other suitable restricted and confined zone such as a cooling cabinet or small room where the temperature can be maintained at approximately 35° F. and the humidity can be maintained at a relatively high level. It is therefore to be understood that when the term "confined zone" is used herein such a confined zone can be provided by bags, boxes, cabinets, small or partitioned rooms, and the like.

In accordance with the preferred process within the scope of the present invention, a quarter of beef weighing approximately 150 pounds and having a mate quarter of equal size were both chilled in a conventional cooler to approximately 35° F. Thereafter, the first quarter was bagged in a polyethylene bag and a Thamnidium solution containing an excess of 100,000 spores per cubic centimeter of solution was sprayed into the bag. At the same time, a pure Terramycin solution of 0.5 gm. in one ounce of water was atomized into the bag. The bag was then sealed and held in the cooler with the mate, unbagged quarter at approximately 35° F. Corresponding steaks from each quarter of beef were cooked and subjected to organoleptic testing at the end of two, five and ten days. The taste panel found a substantial improvement in both tenderness and flavor at the end of the two-day period in favor of the meat processed in accordance with the present invention and found a great improvement in both tenderness and flavor over the control sample at the end of the five-day period. At the end of the ten-day holding period, the taste panel found superb tenderness with a rather "high" aged flavor preferred by many connoisseurs.

In another example of the present processes, mate quarters of beef were cooled as above described and one quarter was then bagged and Terramycin and Thamnidium sprayed into the bag in the amounts discussed above. The bag was then sealed and the two quarters were shipped at approximately 35° F. in a reefer car to a distributor. The two quarters were then divided into retail cuts of meat at the end of five days and were subjected to organoleptic panel testing. Here again, the panel voted unanimously in favor of the treated quarter of beef as compared to the mate quarter finding great improvement in both tenderness and flavor of the cuts of meat from the treated quarter.

In another example of the processes in accordance with the present invention, a dressed 600 pound beef carcass was divided into halves weighing approximately 300 pounds each. Both halves were cooled in the conventional cooler to approximately 35° F. and one half was then placed in a cabinet maintained at 35° F. of a size just sufficient to hold the side of beef. Thamnidium and Terramycin were sprayed into the closed cabinet in the amounts discussed above and the cabinet was kept closed. The mate half was kept in the regular "open" cooler at 35° F. Organoleptic tests were conducted on identical cuts of meat from both halves at regular intervals and the taste panel found exceptional improvement in tenderness and flavor of the treated meat at two, three and five days, particularly at the end of the five-day period.

Whole, round-dressed veal and lamb as well as sides and loins of fresh pork have been treated by the processes described in the examples above with the amount of antibiotic and Thamnidium adjusted to the weight of the treated product, as described above, and in every instance exceptional improvement in both flavor and tenderness has been found.

It should now be apparent that the present invention in every way satisfies the objectives discussed above.

Changes in the illustrative procedures as exemplified above may now be suggested to those skilled in the art without departing from the present inventive concept. Reference should therefore be had to the appended claims to determine the scope of this invention.

What is claimed is:

1. In a process for tenderizing and improving the flavor of meat, the steps of cooling the meat to approximately 35° F., then placing the meat in a confined zone maintained at approximately 35° F., then spraying a Thamnidium solution and a broad spectrum antibiotic solution into the zone, the Thamnidium solution providing at least one spore for each one half square inch of meat surface, the antibiotic solution providing a minimum of 2 p.p.m. and a maximum of 10 p.p.m. of the meat and maintaining the meat in said zone for from two to ten days.

2. In a process for tenderizing and improving the flavor of meat, the steps of cooling the meat to under 50° F. internal temperature, then placing the meat in a relatively air-impervious bag, then spraying an aqueous solution of oxytetracycline and Thamnidium into the bag, the Thamnidium solution providing at least one spore for each one half square inch of meat surface, the antibiotic solution providing a minimum of 2 p.p.m. and a maximum of 10 p.p.m. based on the weight of the meat and maintaining the bagged meat in an air temperature of approximately 40° F. for from two to ten days.

3. The process as described in claim 2, the bagged meat being maintained at approximately 40° F. for from two to ten days during shipping of the meat to the distributor and retailer.

References Cited in the file of this patent

UNITED STATES PATENTS

| | | |
|---|---|---|
| 2,852,391 | Williams | Sept. 16, 1958 |
| 2,926,089 | Williams | Feb. 23, 1960 |
| 2,926,090 | Williams | Feb. 23, 1960 |
| 2,942,986 | Williams | June 28, 1960 |